US011210647B2

(12) United States Patent
Maim

(10) Patent No.: US 11,210,647 B2
(45) Date of Patent: Dec. 28, 2021

(54) TRANSACTIONAL SYSTEM WITH PEER-TO-PEER DISTRIBUTED ARCHITECTURE FOR EXCHANGING UNITS OF ACCOUNT

(71) Applicant: Enrico Maim, Sceaux (FR)

(72) Inventor: Enrico Maim, Sceaux (FR)

( * ) Notice: Subject to any disclaimer, the term of this patent is extended or adjusted under 35 U.S.C. 154(b) by 59 days.

(21) Appl. No.: 14/645,930

(22) Filed: Mar. 12, 2015

(65) Prior Publication Data

US 2017/0091750 A1 Mar. 30, 2017
US 2018/0349877 A9 Dec. 6, 2018

(30) Foreign Application Priority Data

Mar. 12, 2014 (FR) ........................................ 1400594
Mar. 21, 2014 (FR) ........................................ 1400695
Mar. 24, 2014 (FR) ........................................ 1400719

(51) Int. Cl.
*G06Q 20/22* (2012.01)
*H04L 9/32* (2006.01)
(Continued)

(52) U.S. Cl.
CPC ....... *G06Q 20/223* (2013.01); *G06Q 20/3674* (2013.01); *G06Q 20/3829* (2013.01);
(Continued)

(58) Field of Classification Search
CPC ..................................................... G06Q 20/223
(Continued)

(56) References Cited

U.S. PATENT DOCUMENTS 7,194,618 B1 * 3/2007 Suominen ............. H04L 63/123 713/155
7,801,825 B2 * 9/2010 Kranzley ............... G06Q 20/04 705/67

(Continued)

*Primary Examiner* — Hani M Kazimi
*Assistant Examiner* — Paul R Kloberg
(74) *Attorney, Agent, or Firm* — Womble Bond Dickinson (US) LLP

(57) ABSTRACT

A transaction system based on a distributed peer-to-peer computer architecture, said system involving transactions generated by users by means of wallets and allowing the transfer of units of account by feeding inputs from outputs, each transaction (called downstream transaction) having an input directly or indirectly referring to an output of an upstream transaction (or several inputs each referring to an output of a respective upstream transaction) and having an output specifying the number of units of account and an address of a recipient.

The system comprises means for connecting an input of a downstream transaction to an output of an upstream transaction as a function of matching rules between a code computed on all or part of the content of the downstream transaction and a check code contained in the upstream transaction, or conversely, The system further comprises means for propagating a contract, predetermined at an upstream transaction, to a downstream transaction having an input connected to the output of said upstream transaction, said contract being executable on a context for establishing allocation constraints of the output(s) of the downstream transaction, such allocation being authorized only if the constraints are met.

6 Claims, 6 Drawing Sheets

(51) Int. Cl.
*G06Q 20/36* (2012.01)
*G06Q 20/38* (2012.01)
*H04L 9/14* (2006.01)
*H04L 9/30* (2006.01)

(52) U.S. Cl.
CPC .................. *H04L 9/14* (2013.01); *H04L 9/30* (2013.01); *H04L 9/3236* (2013.01); *H04L 9/3242* (2013.01); *H04L 9/3247* (2013.01); *H04L 2209/56* (2013.01); *H04L 2209/68* (2013.01)

(58) Field of Classification Search
USPC .......................................................... 705/41
See application file for complete search history.

(56) References Cited

U.S. PATENT DOCUMENTS 8,583,932 B2 * 11/2013 Furukawa ............. H04L 9/3218 713/176
2004/0117630 A1 * 6/2004 Furukawa ............. H04L 9/3271 713/176
2004/0162984 A1 * 8/2004 Freeman ................ G07C 9/253 713/175
2004/0260653 A1 * 12/2004 Tsuei ................. G06Q 20/4037 705/54
2005/0114666 A1 * 5/2005 Sudia .................... H04L 9/3247 713/175
2006/0041484 A1 * 2/2006 King ..................... G06F 40/174 705/26.81
2006/0107328 A1 * 5/2006 Frank .................... H04L 9/3247 726/26
2007/0168293 A1 * 7/2007 Medvinsky ............. G06F 21/10 705/57
2007/0194129 A1 * 8/2007 Jones ....................... B41M 3/14 235/491
2007/0294183 A1 * 12/2007 Camenisch ............ G06Q 20/06 705/65
2008/0140578 A1 * 6/2008 Felt .................... G06Q 20/3829 705/71
2008/0262969 A1 * 10/2008 Samid .................. G06Q 20/367 705/64
2009/0044013 A1 * 2/2009 Zhu ........................ H04M 15/47 713/170
2009/0235087 A1 * 9/2009 Bird ........................ G06F 21/10 713/190
2010/0064354 A1 * 3/2010 Irvine ................. G06F 21/6218 726/5
2010/0205443 A1 * 8/2010 Zhao ..................... H04L 9/3218 713/171
2010/0325441 A1 * 12/2010 Laurie ................. H04L 63/0815 713/185
2011/0185042 A1 * 7/2011 Wohlert .................. G06F 21/10 709/219
2011/0246779 A1 * 10/2011 Teranishi .............. H04L 9/3013 713/176
2012/0005098 A1 * 1/2012 Gross ...................... G06F 21/31 705/50
2012/0060028 A1 * 3/2012 Furukawa ............. H04L 9/3263 713/156
2012/0089494 A1 * 4/2012 Danezis ................. G06Q 50/06 705/34
2014/0059345 A1 * 2/2014 Camenisch ........... H04L 9/3218 713/165
2014/0363057 A1 * 12/2014 Eckel ................... G06Q 50/265 382/116
2015/0074416 A1 * 3/2015 Suominen ............. H04L 9/0894 713/176
2015/0086088 A1 * 3/2015 King .................. G06K 9/00154 382/118
2015/0120569 A1 * 4/2015 Belshe ................. G06Q 20/065 705/71
2016/0162873 A1 * 6/2016 Zhou .................. G06Q 20/3674 705/67

* cited by examiner

TRANSACTIONAL SYSTEM WITH PEER-TO-PEER DISTRIBUTED ARCHITECTURE FOR EXCHANGING UNITS OF ACCOUNT

FIELD OF THE INVENTION

This invention relates to the field of protocols, such as Bitcoin, for peer-to-peer transactions of units of account, in a decentralized manner on a network such as the Internet, without the intervention of a trusted third party, using electronic signature by means of a software and/or hardware "wallet".

BACKGROUND OF THE INVENTION

The expressive power of Bitcoin is considerable. Indeed, as particularly described and illustrated Mike Hearn in 2013 [https://en.bitcoin.it/wiki/Contracts], one can issue a first transaction which, while offering the advantage of depositing/locking the funds that are inputted therein (from the fact of being inserted into the blockchain), represents a conditional payment for a second transaction, where said condition can consist in requiring signatures to be provided within said second transaction and can even contain "ORs". One can thus express transactions of the type "payment of 1 bitcoin, valid from . . . , on signatures by . . . and . . . or . . . ".

However, once the first transaction is inserted into the blockchain, the funds are thus locked and said condition cannot be changed. The only way to make it evolve—for example if later new signatures are required in the condition—is by making the first transaction to pour the funds into a new first transaction having the desired condition. For example, the condition for the payment of a first transaction being "on signing by X or Y", the money will have to be poured into another first transaction having the condition "on signing by X or by Y or by Z", to replace it. This will require to first obtain the signature of X or Y, which is not always possible.

It is desirable to use a protocol as simple as Bitcoin but without this drawback. The proposed transactions consistency model (and protocol) overcome this limitation of Bitcoin.

The following introduction helps to identify the state of the art concerning the present invention.

FIG. 1 schematically describes the essence of the (consistency) model of Bitcoin by presenting:

the OUTPUT of a first transaction (Tx1), with which are associated:

a certain amount A (for Amount) of units of account, and an address (# PubKey) to which the payment is made, this address being the result of applying a given hash function to a public key "PubKey";

and the INPUT of a second transaction (Tx2), to which are associated:

the said PubKey and the signature ($Sig_{PubKey}$) that can be deciphered with the same public key PubKey, of a content which includes the first transaction (Tx1), the indication of its connected output ('1') and the transaction Tx2 (Tx2 specifying this input and its own outputs—note that the identifier of a transaction is the result of a hash function applied to the contents of this transaction except its inputs).

Hence, when an INPUT of a second transaction (Tx2) gets the amount (A) associated with an OUTPUT of a first transaction (Tx1), the generator of this second transaction necessarily knows:

the public key (PubKey) corresponding to the address (# PubKey) associated with that OUTPUT, and the private key (which she keeps secret) corresponding to that public key (PubKey)—insofar as the signature ($Sig_{PubKey}$(Tx1,1,Tx2)) associated with the second transaction is the result of an encryption using her private key.

The interest of this model is to ensure firstly that the address # PubKey is the only possible beneficiary of the amount (A) in question, and secondly that the owner of that address cannot refute that she has received that amount (A).

A transaction can have multiple inputs—each being connected to an output (and only one) of another transaction—as well as multiple outputs, the sum of the amounts taken by the inputs having to be equal to the sum of the amounts supplied by the outputs.

This model also allows to express conditional transactions, the conditions being signatures to be provided (an output of a transaction can be spent if these signatures are provided). In general, this (known as Pay-to-Script-Hash or # P2SH) is implemented as follows: instead of an address corresponding to a public key (# PubKey), an output may specify the hash of the content of a script associated with the input which will be connected to it. This is defined in BIT-16 Bitcoin Improvement Proposal [https://github.com/bitcoin/bips/blob/master/bip-0016.mediawiki] and [https://en.bitcoin.it/wiki/Transactions#Pay-to-Script-Hash].

Thus, a transaction may transfer a certain amount of units of account to an MULTISIG address for which n of m signatures are required to spend them—for instance, two signatures are to be provided among the signatures of a supplier, a customer and an abiter (i.e. two out of three signatures, the arbiter's signature being needed in case of a dispute between the supplier and the customer).

The transactions are validated against the consistency model presented above and then inserted into an immutable data structure (a linked list of cryptographic hashes), called blockchain. Thus, a transaction inserted ("commit") in the blockchain may not be changed. The blockchain is shared and the Bitcoin protocol ensures that no output connected to an input in a downstream transaction will be connected to an input of another downstream transaction (no "double spending").

The blockchain functions as a ledger reconstructing the history of transactions and allowing anyone to verify them: when an individual A does a transfer of a number of units of account from one of its addresses to an address of an individual B, A must prove where these units of account come from. And so, it transmits information such as "these units of account are those I obtained when C sent them to me two days ago." And insofar as all users have the same copy of the blockchain, everyone can verify that C actually sent these units of account A and they have not been sent by A to someone else. Further in the chain, one can also check how C has itself obtained these units of account and thus trace the chain of their successive owners. In other words, one can reconstruct the history of transactions and therefore their validity, provided that the initial transactions are valid. The transactions included in the blockchain being validated, there is no longer need of a trusted third party or a chain of trusted third parties as in the case of a network of financial intermediaries (the banking system), so neither these intermediaries themselves.

The fact that, in the case of # P2SH, the address associated with an output (of an "upstream transaction") is the result of applying a hash function to the content of a script associated with the input (of a "downstream transaction") that connects to it, means that a large variety of types of transactions can be expressed. An input may for example specify an address which is the result of applying a hash function on a script including a sought content—meaning "I pay this amount in exchange of a content for which I only give the hash code"—so that anyone who knows the content in question (and who agrees to disclose it by putting it in the blockchain) can benefit from this amount.

However, in the existing consistency model of Bitcoin, said script on an input of a downstream transaction (connecting to the given # P2SH output of an upstream transaction) has no effect on the outputs (of that same downstream transaction). Indeed the Bitcoin protocol provides no validation to check constraints that would relate to outputs of the downstream transaction (constraints that would be provided in said script).

SUMMARY OF THE INVENTION

The present invention aims at filling this gap by extending the consistency model described above and at enabling conditional transactions to be performed in a dynamic context of payment conditions, without requiring repeated signatures as described in the introduction. In other words, the invention aims at extending the possibilities of a Bitcoin-type system to validate the transactions according to a new consistency model.

It is thus proposed a transaction system based on a distributed peer-to-peer computer architecture, said system involving transactions generated by users by means of wallets and allowing the transfer of units of account by feeding inputs from outputs, each transaction (called downstream transaction) having an input directly or indirectly referring to an output of an upstream transaction (or several inputs each referring to an output of a respective upstream transaction) and having an output specifying the number of units of account and an address of a recipient, the system comprising:

means for connecting an input of a downstream transaction to an output of an upstream transaction as a function of matching rules between a code computed on all or part of the content of the downstream transaction and a check code contained in the upstream transaction, or conversely, the system further comprising:

means for propagating a contract, predetermined at an upstream transaction, to a downstream transaction having an input connected to the output of said upstream transaction, said contract being executable on a context for establishing allocation constraints of the output(s) of the downstream transaction, such allocation being authorized only if the constraints are met.

Certain preferred but non-limiting aspects of this system are as follows:

the addresses of the downstream transaction outputs are obtained by a coding operation applied to the contract and a context.

the coding operation includes a hash code generation.

the predetermined contract is common to a plurality of upstream transactions having outputs respectively connected to several inputs of the downstream transaction.

the allocation of a downstream transaction output is authorized if the allocation constraints corresponding to at least one of the upstream transactions are met.

the allocation of a downstream transaction output is authorized if the allocation constraints corresponding to all upstream transactions are met.

the allocation constraints include possible output addresses.

the addresses correspond to multi-signatures.

the allocation constraints comprise maximum amounts of units of account associated to output addresses.

the allocation constraints comprise transaction types.

the transactions are organized in pots associated to respective users, and wherein the allocation constraints are defined pot by pot.

the context comprises upstream transaction output identifiers, so that said allocation constraints evolve dynamically as a consequence of the addition of new transactions upstream of said downstream transaction, in such manner that the allocation of outputs of the downstream transaction can be implemented with an evolving group of users capable of generating upstream transactions over time, without having to initially know said users.

It is proposed according to another aspect a method for minimal and anonymous identification of a user that can potentially benefit from rights (advantage), comprising the following steps:

interacting with a source of rights from a user terminal, at said source, communicating to the user terminal a verification program (in ZK-SNARK) except if said user terminal already contains such program, as well as a specific character string representative of a validity period for benefiting from the rights, or generating said character string by said program, at said user terminal, executing the verification program for anonymously proving its possession of an identity document, said check program receiving as a private input machine-readable data from said identity document and as a public input said specific character string, and a hash code obtained by combining said specific character string and the identity document data, providing to the source of rights the hash code thus obtained and a proof of execution of the verification program, checking at said source said execution proof, and delivering rights for the considered period of time, wherein no relation between the hash codes obtained for one same user and allowing the latter to benefit from rights at different periods of time can be established by said source of rights, whereby the user anonymity is preserved.

Finally, it is proposed a method as defined above, wherein the rights are units of account as transacted in the system according to the system as defined above.

BRIEF DESCRIPTION OF THE DRAWINGS

Other aspects, aims and advantages of the present invention will better appear from the following detailed description of preferred embodiments thereof, given by way of non-limiting example and with reference to the appended drawings, in which.

DETAILED DESCRIPTION OF PREFERRED EMBODIMENTS

Figure 2:
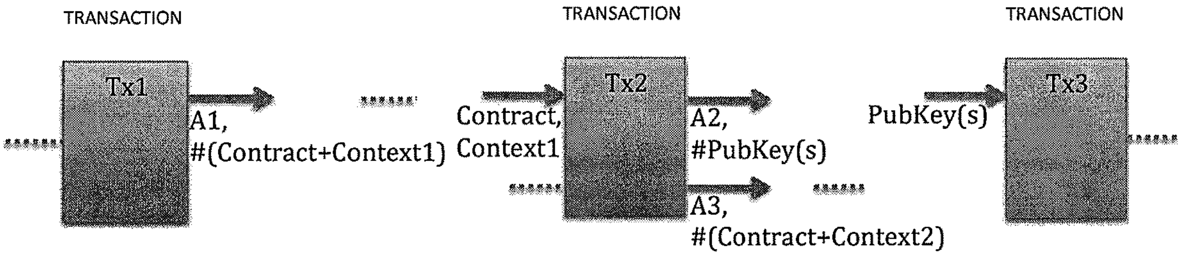
FIG. 2 shows three transactions and additional elements to implement the new consistency model according to the invention.

The consistency model implemented according to the present invention is diagrammatically shown in FIG. 2. An indirection (or multiple indirections), represented as a transaction Tx2 between a funding transaction Tx1 and a payment transaction Tx3 (respectively multiple payments), allows a degree of freedom in the payments due to the fact that now payments are constrained with respect to a common executable contract (Contract) that must be interpreted according to the current context (Context1, Context2), these constraints being generated by executing the said contract, which is executable as a computer program, by taking said current context as input.

Figure 1:
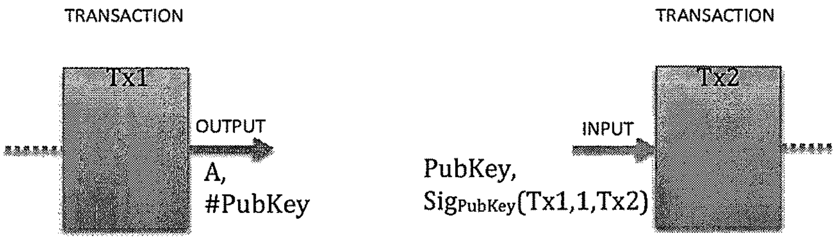
FIG. 1 illustrates two types of Bitcoin transactions and their consistency model.

Compared to FIG. 1, FIG. 2 now shows that:

- the address on the output of the Tx1 transaction is not determined by the key(s) PubKey(s) of the beneficiaries, but by the context (Context1) at the time of the generation of this transaction Tx1, as well as by the content of the contract (Contract),
- the first output of the Tx2 transaction allows payment to beneficiaries (same payment as the output of Tx1 in FIG. 1),
- and, as for the output of Tx1, the address on the second output of Tx2 is determined by the context (Context2) at the time of the creation of this transaction Tx2 and the content of the same contract (Contract).

For each transaction (take for example Tx2), in addition to traditional verifications specified in the Bitcoin protocol, before insertion into the blockchain (these verification essentially consisting in controlling the inputs of the transaction in question (Tx2) against the upstream outputs (of Tx1) as described in the preamble), the validity of the outputs of the transaction in question (Tx2) is also verified vis-a-vis the contract applied to the context (Context1).

Note that Tx2 can have inputs connected to multiple upstream transactions of the type Tx1 or Tx2, and that several Tx2 type of transactions can be generated in the chain, thus allowing several payments. The method of the invention consists in validating the outputs specific to each transaction according to the consistency model presented in FIG. 2. As already indicated, the purpose is to validate transactions between each other, like in Bitcoin before insertion into the blockchain but this validity now depends, in addition, on the compliance of the transaction with the application, on the current context, of the unique executable contract binding the parties. Due to the inclusion, in the output of the upstream transaction, of the verification code (such as a hash-code) of a content explicitly containing the contract (or a hashcode of that contract) associated with the downstream transaction, the method of the invention ensures that all transactions of a chain of transactions (such as Tx1, Tx2, Tx3) apply the same contract.

We will now present two main embodiments of the method of the invention and detail these validations.

First Embodiment

First we introduce the concepts of "contract" and "context", the application of a contract on a context resulting in "constraints".

As mentioned in the preamble, it has recently been introduced in Bitcoin an option to specify the condition of an output by placing in it the hash of this condition (called « Pay to Script Hash» or # P2SH), which must be provided in clear in the input of the transaction that uses this output (and this condition must be satisfied for that transaction to be valid). To date, the conditions that can be expressed in Bitcoin are merely conditions of multi-signatures to be provided in said input. We will use this method in the following examples.

Figure 3:
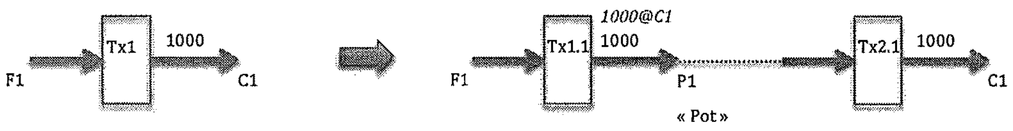
FIG. 3 illustrates how a Bitcoin type of transaction can be represented by two transactions linked by a constraint.

The left side of FIG. 3 presents an example thereof:

A transaction "Tx1" provides 1000 units of account to a recipient node identified by a hash code referred to as "C1", these 1000 units can only be consumed by an input with a script whose hash code (obtained by applying a predetermined hash function on its content) is that C1, that input including signatures that meet the condition specified in that script.

As for the right part of FIG. 3, it presents exactly the same payment as on the left side (i.e. 1000 units to C1) but it introduces an indirection according to the method of the invention:

The 1000 units are, in a first transaction (called upstream transaction) "Tx1.1", paid to a receiving node "P1" (so-called Pot), from which, in a second transaction (called generated transaction or downstream transaction) "Tx2.1", the payment of 1000 units must comply with a constraint represented by "1000@C1" (meaning that it must provide 1000 units to C1) imposed by the first transaction implicitly or not (thus in the figure, the constraint is shown on the output of the upstream transaction, in italics).

More specifically, P1 is a verification code obtained by applying a predetermined function to the script of the input of Tx2.1, and Tx2.1 must comply with the constraint (here the constraint 1000@C1) produced by the script of this input. (How this constraint is produced is described later.)

Note that, as we shall see later (for example in FIG. 5), a generated transaction can have multiple inputs and to be valid it has to comply with a constraint issued by one of its inputs.

In the following we will take the example of suppliers ($F_i$) which, in transactions (Tx1.$i$), lock units of account that cannot be unlocked unless (according to a condition $C_i$) the customer (for that $C_i$) and the supplier both sign the transaction, or the "arbiter" (or "arbitrator") signs the transaction with the supplier. The lockings (with these signature conditions) are intended to assure the respective customers that if they are not delivered satisfactorily, the units of account that have been locked will be returned to them.

In a "risk pooling" approach, suppliers are organized in a "community" and use the method of the invention to deposit (lock) units of account in a pot, the commitments by the suppliers to the customers being thus done through the pot rather than directly by each one. Thus, the probability of having to pay a customer being less than 1, the more the pot is filled, the lower the amounts locked by the respective suppliers.

The term "locking" is used here to highlight that these deposits are transactions inserted into the blockchain to ensure that the deposited units of accounts (from an upstream output) cannot be double-spent (but possibly returned further downstream in the case of a multi-signature $C_i$ permitting it).

Note that depending on the community at stake, the aforementioned arbiter (having the role to provide the second signature in case of two of three signatures needed) may need to be approved by the community (for the downstream transaction to be able to be validated). Moreover, the frequency of interventions may be limited (as a precaution).

In FIG. 3 (and in the following figures), the verification code "Pot" is the hash code of the script content of the input of a generated transaction, the script allowing to generate constraints such as 1000@C1 that will be checked in relation to the outputs of said generated transaction. These constraints are generated by execution of a program called contract (or "community contract" that binds the community members at stake as far as the locking modalities and downstream transactions generation are concerned) on parameters called invocation context (or context). Both the contract and the context belong to the input of the generated transaction.

The various suppliers are mutually constrained regarding their lockings because they share the same contract and, for all the lockings by the members of a given community, the transactions Tx2*i* are generated by the application of the same contract. In other words, only those transactions that conform to the contract are valid.

Said contexts contained in the input are signed by the community. In a particular embodiment, it can be a multi-signature (by n among m community members) or a signature by a computer in "trusted computing" mode. In trusted computing systems (which is a known technology), the computer has a pair of public/private keys is, the private key being written in the hardware without any possibility of external reading, hence being is kept secret, and can be used to sign on behalf of the community.

Since the programs that are executed in a trusted computing system can be authenticated (by generating hash codes for these programs and signing them with the aforementioned secret private key, a technique known as "remote attestation"), this approach allows not only to check (by comparing the hash) that it is the correct code that is executed, but also to secure the data sent to the program by encrypting it with the public key corresponding to aforementioned secret private key, and be sure of the integrity of the signed results returned. Such programs can thus be used to implement a protocol for the functioning of a community such as described later and presented in a sequence diagram in FIG. 4.

In summary, the transactions according to this embodiment are characterized in that they contain the following elements:

In the output of the upstream transaction:

i. Value: number of units of account ii. Hash(Contract+Context): hash code « Pot» (like the « [20-byte-hash-value]» of « OP_HASH160 [20-byte-hash-value] OP_EQUAL» of BIP 16) resulting from applying the predetermined hash function to the content of the script of the input in question of the generated transaction, In the script of the input of the generated transaction:

i. Contract, ii. Signed invocation context related to the connected output.

Validation consists in:

- verifying that all the inputs of the generated transaction include (in their respective scripts) the same contract, as well as the signature (or multi-signatures) of the supplied invocation context by the community;
- obtaining the hash code of the script content (Contract+Context) of each input of the generated transaction and compare it with the hash code provided in the output it connects to and make sure they are identical, and
- executing said contract on the said invocation context relative to the connected output, in order to:

1. obtain the constraints (constraining outputs), and then
2. verify that for one input of the generated transaction the obtained constraint is satisfied by the outputs of the generated transaction (this will be illustrated in the examples below).

Figure 5:
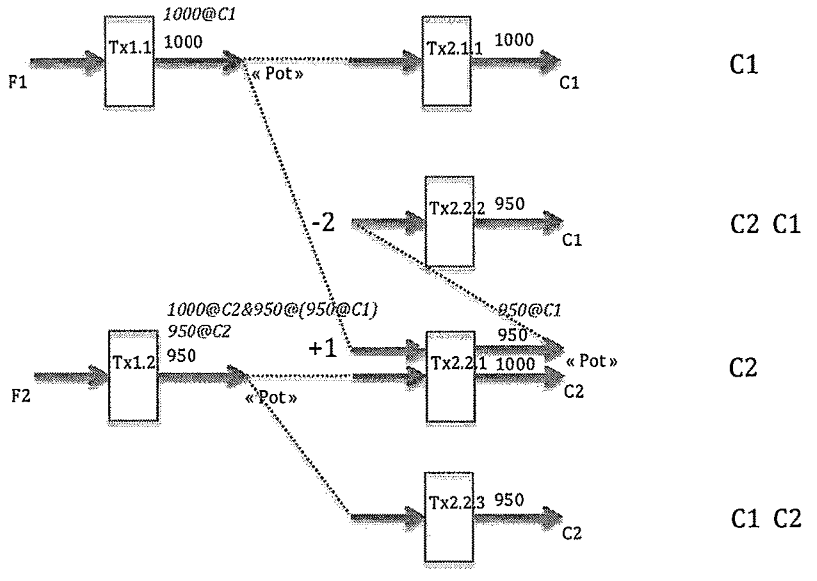
FIG. 5 shows the creation of new transactions according to the invention when a new actor of a certain type participates in a pooling of risks between actors.

The verification succeeds with just one compliant input (that is to say, it is sufficient to satisfy the constraints issued by a single connected output), since a generated transaction cannot comply with the constraints issued by an upstream transaction earlier than its own upstream transaction; indeed it can (as far as it benefits from an assistance) have an input benefiting thereof (as will be described in the following example presented in FIG. 5).

We will now illustrate the generation of a community and describe how the pooling of risk is achieved. In the following example, the principle is that the first supplier (or one or more substitutes) plays a coordinating role (Root) and informs the other suppliers about the context, according to the protocol shown in FIG. 4. The context thus communicated to successive members of the community includes the current set of outputs available in the pot (corresponding to the previous deposits or a subset thereof as will be seen in an example shown later), to which payments (to be generated as per the contract) may connect, the remainder of units of account taken from these outputs being put back to the pot for the next payments. Each supplier can thus complement payments from other suppliers in case their commitments to their customers are not fully covered.

Figure 4:
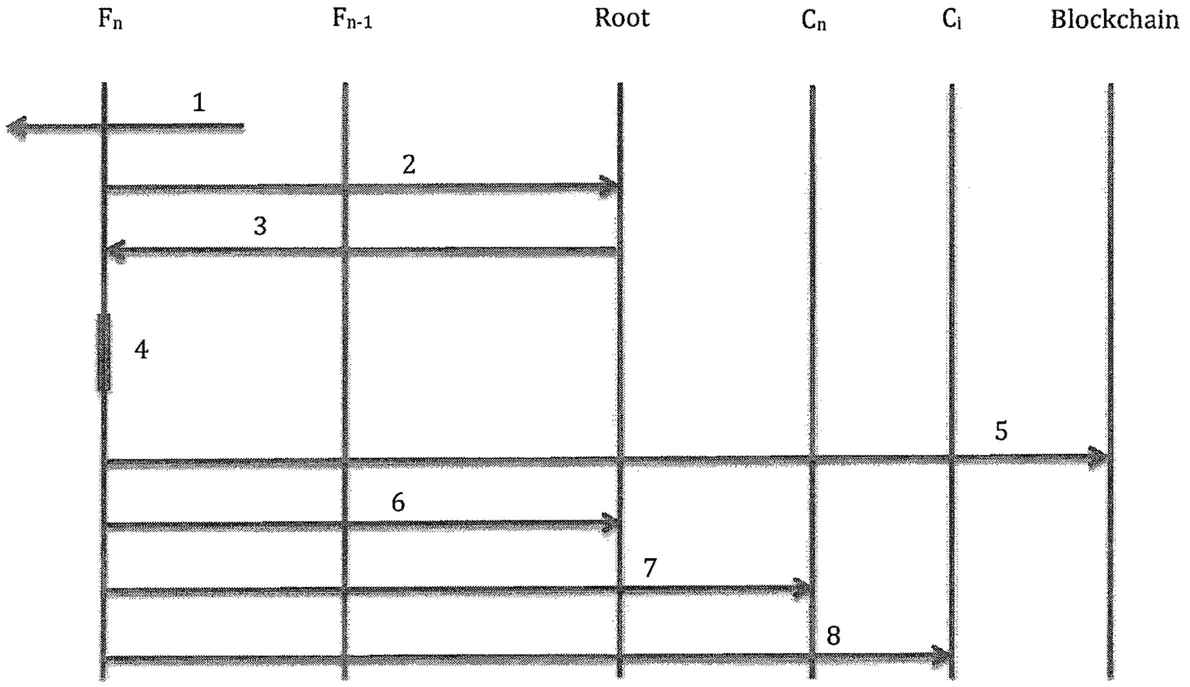
FIG. 4 is a sequence diagram illustrating interactions between different actors (wallets) in a method according to the invention.

FIG. 4 is a sequence diagram showing the interactions between the different actors involved. '$F_n$', '$F_{n-1}$' and 'Root' are suppliers, '$C_n$' and '$C_i$' are customers, 'Blockchain' represents the network: an arrow to 'Blockchain' indicates announcing one or more transactions in the network to have them included in the Blockchain. 'Root' is the community initiator, the first supplier, or a set of other suppliers when the current root isn't functional (e.g. the current root leaves the community, or becomes unavailable). Interactions are represented here without specifying whether they are carried out manually or automatically (the value of automatic processing is presented just after). The numbers in the figure correspond to the following steps:

1. A new supplier '$F_n$' is introduced in the community by the supplier '$T_{n-1}$' which communicates the 'Root's address (or new contribution is requested by an existing supplier)

2. '$F_n$' requests confirmation from 'Root' by providing the identifier of '$T_{n-1}$' (typically can be added here sub-steps of validation of the new member's entry into the community and of insertion into the context of special parameters, such as the volume of outputs available in the pot to be considered for this new member)

3. In case of confirmation, 'Root' provides the current state of the community containing in particular all (or a subset of) available outputs with their own respective contexts (to allow a new input to consume them)+the set of values (number of units of account) expected by the respective customers, the available outputs and the expected values representing essential elements of the context used in point 4

4. '$F_n$' hashes the contract and the context to generate the hash that will appear in the output of its deposit (Tx1.$n$)

5. '$F_n$' announces its payment (Tx1.$n$) in the network

6. '$F_n$' generates the constraints and the corresponding transactions and accordingly sends to 'Root' an update of the context 7. '$F_n$' may itself inform its customer '$C_n$' about the transactions which are made available 8. '$F_n$' may itself inform the other customers about the transactions that they will potentially benefit.

One can of course consider a system to assist suppliers (or other type of entities, as mentioned later) to generate constraints and transactions and to assist customers (or other potential beneficiaries of these transactions) to also generate transactions as appropriate to get paid and in due time to announce these transactions in the network and make their insertion in the blockchain.

The contract can be designed to take account of requirements and preferences (provided in the context), particularly as to the volume of the amounts provided potentially payable by the generated transactions (i.e. to ignore some deposits in the pot and exploit others) and constraints produced accordingly, as seen in the example presented below.

The right side of FIG. 3 presented the deposit in the pot of 1000 units of account by a first supplier (following the creation of a new community and its contract). FIG. 5 shows in addition the transactions added for a second supplier. We see in this figure four lines of transactions, corresponding to the consumption order of the outputs of the first transactions Tx1.$i$. Thus, for the case of delivery defects by two suppliers, F1 and F2, for two respective customers, C1 and C2, the first line of transactions shows the case of a first payment to C1 by F1 in case of delivery default by F1 to C1, the second line is for the case of payment to C1 by F1 after C2 was paid in case of successive delivery defects, the third line shows the case of a first payment to C2 in case of delivery default by F2 to C2, and the fourth line shows C2 payment by F2 after payment to C1 has already been done.

Restitution to suppliers of amounts locked (in case deliveries were carried out properly) follows the same process, the beneficiaries of transactions being in this case F1 or F2 instead of C1 or C2. So, by the C, we mean, rather than the customer, the conditions (multi-signatures) for a payment to the customer or supplier of level i.

The constraints are presented here in a compact syntax for specifying the amounts and the recipients nodes. Thus, on Tx1.2, $_{950@(950@C1)\&1000@C2}$ and $_{950@C2}$ form a constraint (which can be represented as $_{950@(950@C1)\&1000@C2\|950@C2}$) meaning "generated transaction having a first output paying 950 units of account (implicitly into the Pot) from which another generated transaction pays 950 units of account to a condition C1 and a second output paying 1000 units of account to a condition C2, and a generated transaction having an output paying 950 units of account to a condition C2".

The addition of a new locking to the pot allows complementing the transactions that did not pay the total amounts expected by the customers. For instance, as far is the sequence "C2 C1" is concerned (meaning first 'C2 or F2' is paid, then 'C1 or F1' is paid), Tx2.2.2 pays only 950 units of account while the customer C1 possibly expects to receive 1000.

Figure 6:
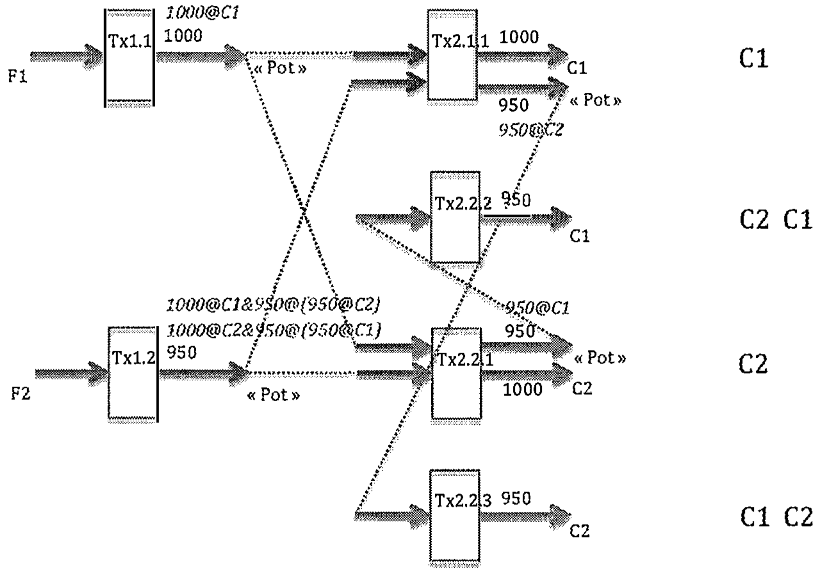
FIGS. 6 and 7 illustrate generalizations of what is illustrated in FIG. 5, FIG. 8 schematically shows an example of networked pooling of risks using a second embodiment of the invention.

FIG. 6 shows a way to generalize the process and facilitate the implementation of a contract, a (simplified) example of which being presented (encapsulated between tags in the XML formalism) in Annex 1. Compared with FIG. 3, in FIG. 4 the generated transaction Tx2.2.3 is connected to an output of the generated transaction Tx2.1.1 instead of being connected to an output of the deposit (Tx1.2) by F2, which itself feeds Tx2.1.1 although the latter was already sufficiently fed by Tx1.1. This way, the mechanism works regardless of the amounts locked by different vendors. For example Tx1.1 may consist of a locking lower than the amount expected by C1 (pending other suppliers participating in the pot and complement its deposit).

Figure 7:
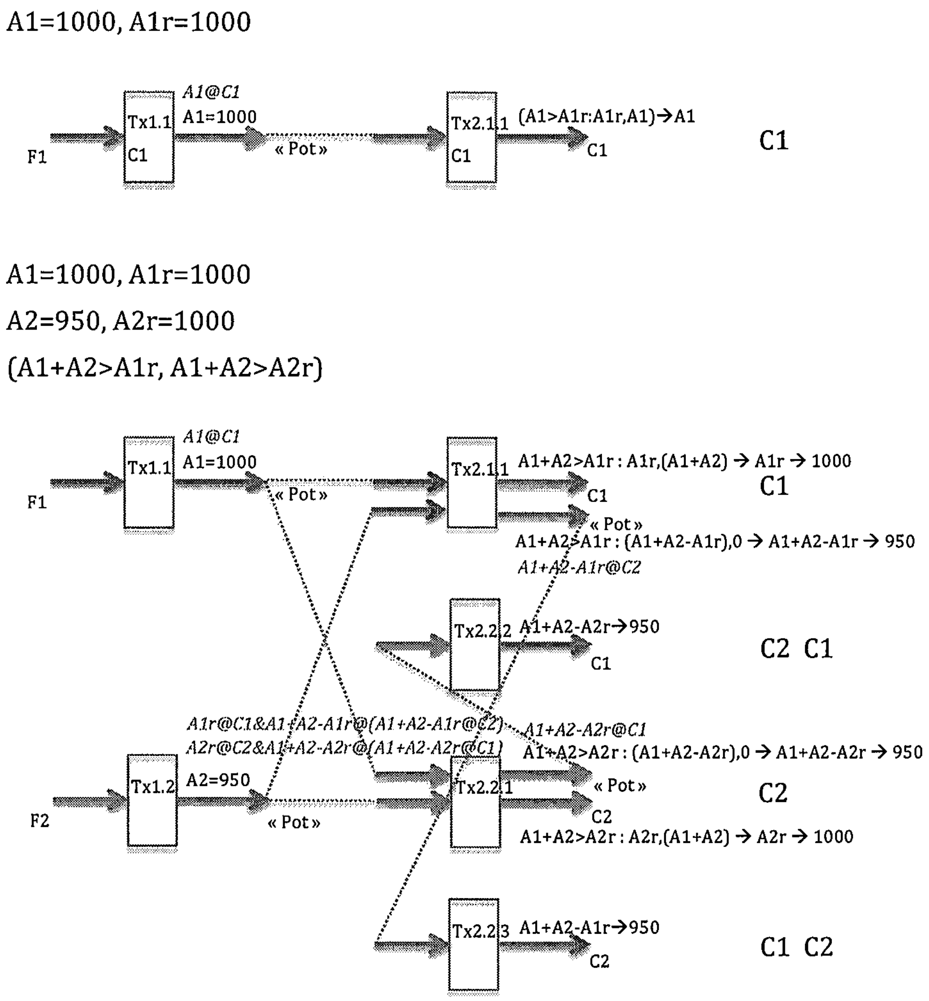

FIG. 7 shows the principle of the method thus generalized, with conditions on amounts A deposited by suppliers $F_i$ vis-à-vis the expected amounts $A_i r$ (for Required Amount) by customers $C_i$, to determine the amounts to be specified on outputs, as implemented in the program given in Annex 1 as a simplified example. Thus, (the first output of Tx2.1.1, after the introduction of F2) "$_{A1+A2>A1r:\ A1r,(A1+A2)\to A1r\to 1000}$" means « If A1 (i.e. the deposit by F1)+A2 (i.e. the deposit by F2) is greater than Air (i.e. the expected amount C1), then the output pays Air (here this is the case, and the output therefore pays 1000 units of account) else the output pays A1+A2.

By the program presented in Annex 1, for the following context (where there are 3 suppliers F1, F2, F3, these suppliers depositing respectively 1000, 950 and 900 units of account, and their respective clients C1, C2, C3 each waiting for 1000 units of account)

```
List<Output> availableOutputs = new LinkedList<Output>( );
    availableOutputs.add(new Output(1000,"F1"));
    availableOutputs.add(new Output(950,"F2"));
    availableOutputs.add(new Output(900,"F3"));
List<ClientRequirement>    currentRequirements    =    new LinkedList<ClientRequirement>( );
    currentRequirements.add(new ClientRequirement(1000, "C1"));
    currentRequirements.add(new ClientRequirement(1000, "C2"));
    currentRequirements.add(new ClientRequirement(1000, "C3"));
```

the following constraints (to which generated transactions must respectively comply) are generated:

1000.0@C1&1850.0@((1000.0@C2&850.0@ (850.0@C3))∥(1000.0@C3&850.0@(850.0 @C2)))

1000.0@C2&11850.0@((1000.0@C1&1850.0@ (850.0@C3))∥(1000.0@C3&1850.0@(850.0 @C1)))

1000.0@C3&4850.0@((1000.0@C1&850.0@ (850.0@C2))∥(1000.0@C2&850.0@(850.0 @C1)))

As to the (simplified) context presented in Annex 2, context provided to F5, it includes the outputs from the suppliers F1 to F4, and F5 restricts the generated constraints to a total amount of contributions of 2000 units of account and 2 contributions at least (in this example), as we see hereafter in the function call

```
<< generateConstraintsAutoSelectOutputs(f5, availableOutputs, c5,2000,2); >>.
   Output f1 = new Output(1000, "F1");
   Output f2 = new Output(950, "F2");
   Output f3 = new Output(900, "F3");
   Output f4 = new Output(850, "F4");
   Output f5 = new Output(800, "FS");
   ClientRequirement c1 = new ClientRequirement(1000, "C1");
   ClientRequirement c2 = new ClientRequirement(1000, "C2");
   ClientRequirement c3 = new ClientRequirement(1000, "C3");
   ClientRequirement c4 = new ClientRequirement(1000, "C4");
   ClientRequirement c5 = new ClientRequirement(1000, "C5");
   List<Output> availableOutputs = new LinkedList<Output>( );
   Pledge p1 = new Pledge( );
   p1.addClientRequirement(c1);
   Pledge p2 = new Pledge( );
   p2.addClientRequirement(c2);
   Pledge p3 = new Pledge( );
   p3.addClientRequirement(c3);
   Pledge p4 = new Pledge( );
   p4.addClientRequirement(c4);
   Pledge p5 = new Pledge( );
   p5.addClientRequirement(c5);
   f1.setExistingPledge(p1);
   f2.setExistingPledge(p2);
   f3.setExistingPledge(p3);
   f4.setExistingPledge(p4);
   f5.setExistingPledge(p5);
   availableOutputs.add(f1);
   availableOutputs.add(f2);
   availableOutputs.add(f3);
   availableOutputs.add(f4);
   List<Constraint> lc = generateConstraintsAutoSelectOutputs(f5, availableOutputs,
c5,2000,2);
   for (Constraint c : lc) {
      System.out.println(c);
   }
```

This program (also simplified) generates the following constraints (which generated transactions must respectively comply):

1000.0@C5&1550.0@((1000.0@C4&550.0@(550.0@C3))||(1000.0@C3&550.0@(550.0 @C4)))

1000.0@C5&650.0@(650.0@C4)

1000.0@C5&700.0@(700.0@C3)

800.0@C5

Note that this program only generates downstream transactions receiving contributions from previous suppliers (suppliers F1 to F4 do not receive contributions from F5).

These programs can easily be extended by the skilled person for generating transactions themselves.

In a variant of this embodiment, the invocation Context and/or the Contract can be placed on the output of the upstream transaction, the receiving node still being represented by the hash of the invocation Context and the Contract, or represented by the hash of the Contract only. However, the fact that the system works with this variant must be detected, in order to, at validation phase, produce the constraints by executing the contract on the context and to verify that the outputs satisfy them (as already described). This detection can be accomplished for example by placing in the output in question the information that the system operates according to this variant.

These methods may be combined, each output containing information of the considered mode, explicitly or implicitly.

The generated transactions can possibly be "locally" validated. In this case, the generated transactions are conditional transactions of the type Pay-to-Script-Hash (classically). In each generated transaction, the signature of its validity by the community—by that we mean a multi-signature or the signature of a trusted computing computer—must then be added (before broadcasting it to have it included in the blockchain). It is understood that it is then not necessary to keep in extenso the content of inputs, if the validators (via Root) are capable of rebuilding and checking the outputs of the generated transactions. The limit of this approach is that any transaction authorized by the community can tap into a supplier $F_n$'s deposit. So it is better to implement the entire protocol shown in FIG. 4, because it is indeed a contract between $F_n$ and the community (represented by Root) and this protocol allows $F_n$ to generate constraints themselves on the basis of this contract and the current context, in agreement with the community, and to ensure that they will be respected. It follows that the most advantageous approach to this embodiment is to make the signature of the community verified by the network (signature provided on the transaction and indicating that the generated transaction has already been verified by the community, locally, as mentioned above) with regard to the signature of the invocation context provided in each input (by comparing the public keys corresponding to the private keys that were used to sign). We then have the assurance that $F_n$ and the community are in agreement.

A variant of this first embodiment based on zero-knowledge proof techniques will now be described.

In the article « SNARKs for C: Verifying Program Executions Succinctly and in Zero Knowledge» (http://eprint.iacr.org/2013/879, the content of which is part of the present description) Eli Ben-Sasson et al. describe their work on correct execution zero-knowledge proof for programs written in C. According to these results, a program can be executed in a special environment which allows to obtain a succinct proof, that can be verified in a very short time, of (i) the integrity of the program that was executed (that is to say, the proof that the program has not been altered) et (ii) its correct execution. Moreover, the execution of the said program can also be done by taking in input private data which is not disclosed.

An embodiment of this variant includes specifying, in the output of the upstream transaction, a verification code of the correct program execution's (zero-knowledge) proof, and the proof itself must be present in the input of the generated transaction that connects to this output. Here the said program is the contract and the data supplied to it is the invocation context and the outputs of said generated transaction.

Compared to the first embodiment described above, here the program forming the contract (whose execution proof is provided in an input of the generated transaction) is slightly different in the sense that the constraints produced by its execution are directly verified (during that execution) on the outputs of the generated transaction containing that proof in an input, whereas in the previous embodiment, only constraints are generated by the contract, which is applied on the context, then the verification is made separately from the program.

In this approach, the verification code is analogous to the hash described above, but the advantage of this approach is that the validation of the constraints (constraining the output of the generated transaction) can be accomplished only once (just to provide this proof once). Insofar as verifying the proof takes much less time than executing the contract on the context and verifying the constraints on the outputs of the generated transaction, generating that proof only once may be more advantageous (although that proof generation may take a considerable time) than re-executing the contract n times to validate by n signatures a generated transaction (if one would wish that n validators verify every transaction generated—rather than Root only—to validate it on behalf of the community).

In general, the method of the invention according to this embodiment can be applied to any case of risk of pooling.

The invention has been described by taking an example of a deposit of units of account by a supplier to reassure a customer, but one can of course also apply the same method for the case of a customer depositing units of account to reassure a supplier, the same advantage of pooling (typically of risks pooling) existing in the case of pooling between customers.

One can also pool risks of illness or accident and lock units of account to cover medical treatment expenses, etc. Also it is not only about covering suppliers or customers but any type of actors, who one the one side poll each other and on the other side accept to receive guarantees by a community of such polled actors.

Note also that this first embodiment of the invention applies to architectures where downstream transactions refer directly to upstream transactions (eg the Bitcoin system) as well as to architectures where this reference is indirect (e.g. the Zerocash system based on zero-knowledge proof, enabling non-disclosure of the origin of units of account). The skilled person will in this case know how to make the necessary adjustments.

Second Embodiment

A second embodiment of the method of the invention will now be described, which also consists in validating each transaction based on the consistency model shown in FIG. 2, but additionally based (in the context) on the specification of transaction types and input parameters they admit, thus constraining the outputs of the downstream transaction in a particular manner.

Figure 8:
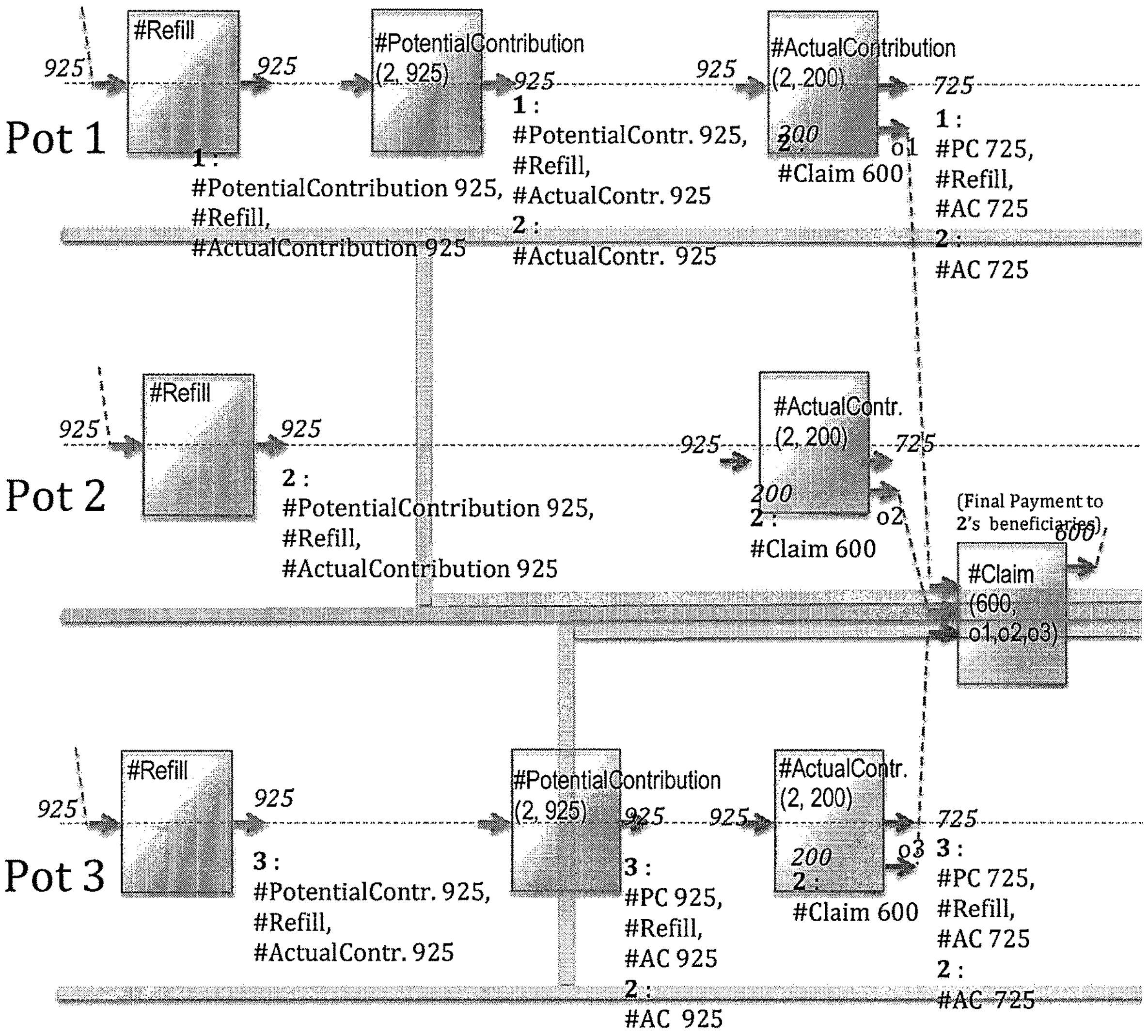

FIG. 8 diagrammatically depicts a networked risk-pooling example using this embodiment.

In this embodiment, the blockchain is structured in different "pots", each associated with an individual user terminal and to the damage risk that this user can be exposed to. Each transaction can have inputs connected to several upstream transactions from different pots and several transactions can be generated on a same pot e.g. to allow multiple payments.

In the example shown in FIG. 8, users:

- each have a pot that they feed through « Refill» transactions;
- specify « Potential Contribution» transactions to other users should a damage occur to them;
- generate, when a damage occurs, « Actual Contribution » transactions from the users' pots which have issued Potential Contribution transactions;
- at last generate final payment transactions "Claim" or "Claim Payment").

A special case of transaction in this embodiment consists in aggregating outputs from transactions which are on different pots in the blockchain. The "Claim" transactions are in this case; they have inputs connected to outputs of transactions on different pots, to provide, in their own output, the sum of their amounts.

In FIG. 8, the pots (Pot1, Pot2 and Pot 3) are represented in dashed lines. The « Potential Contribution» transactions generate branches in thick grey lines from the pots, on which pot aggregation transactions (# Claim) can be placed.

FIG. 8 shows an example where three pots each receive 925 units of account locked by a "Refill" transaction. The first and third pots each create a "Potential Contribution" type transaction to cover the risk associated with the second pot for up to 925 units of account. A damage actually occurs at the second pot, this damage implying a payment of 600 units of account to be made. Then the user terminal (that may be called "wallet" in the bitcoin jargon) associated to the second pot automatically generates "Actual Contribution" type transactions, each for 200 units of account, on the three pots, namely: its own pot and the other two pots that have issued a "Potential Contribution" transaction for the second pot. Finally, the same "wallet" generates the "Claim" payment transaction of 600 units of account to settle this damage.

The system as thus implemented allows generating transactions for locking units of accounts in pots, declaring mutual help from these pots and actual payments in case of damage, that can occur at any time but that must comply with the constraints imposed by the contexts implicitly specified in the outputs of the upstream transactions, these constraints resulting from the application on these contexts of the common contract used to generate the outputs of a downstream transaction.

More specifically, each constraint indicates, for each pot, the authorized downstream transaction types and the parameters (such as the amount not to be exceeded) that the contract execution must take as input to generate the outputs of these transactions (Cf. Annex 3).

Thus it is seen in FIG. 8 that the first transaction on the first pot, which is of the "Refill" type, implies that only a transaction of type "Potential Contribution" (for up to 925 units of account), of type "Refill" or of type "Actual Contribution" (for up to 925 units of account) can be generated at its downstream and only in the same pot. The second transaction in the first pot, which is of type "Potential Contribution", imposes that exclusively (i.e. no pot other than the following ones can be generated at its downstream):

on the first pot, as in the previous transaction, only a transaction of type "Potential Contribution" (for up to 925 units of account), of type "Refill" or of type "Actual Contribution" (for up to 925 units account) can be created at its downstream;

on the second pot, only a transaction of type "Actual Contribution" (for up to 925 units of account) can be generated at its downstream.

And so on, each transaction thus restricting the set of transactions that can benefit from the units of account specified on its outputs.

Finally, it should be noted that the two embodiments presented herein enable "networked" risk sharing. Let's take an example and suppose that two users each have a small house, think that the likelihood of a fire is very low and would cost 10,000 units of account. They decide to hedge for this amount and put 5,000 units of account each in a pot for this purpose, as described above. Suppose a friend also has a small house and decides to join them. He puts 3,333 units of account in his pot and so the first two users can withdraw 1,666 units of account each. And so on . . . Their common contract of risk sharing in P2P does not require any financial intermediary. Obviously, if there are other users who join them, they will certainly have some expenses to pay an arbiter (arbitrator), validator or mediator, confirming that the fire was not intentional, etc. but without requiring an intermediary that would keep the amounts locked. Finally, another characteristic advantage of networked risk sharing is that when 'n' people connect to share the risk, the 'n+1'th person does not need to connect with the 'n' first but with some of them only. We thus obtain a social network, where the connections of each one may be different. This type of structure is likely to be extended much more widely than with a centralized risk pooling.

Another Object of the Invention

Another object of the invention relates to the automatic generation of rights, including units of account like the ones transferred by transactions of the types described above.

The state of the art concerning this object of the invention is described in the article « Verifying computations without reexecuting them: from theoretical possibility to near practicality» http://eccc.hpi-web.de/report/2013/165/download/, and in the aforementioned article http://eprint.iacr.org/2013/507.pdf published Oct. 7, 2013, by Eli Ben-Sasson & al. proposing a system able to prove the execution of a program that can take private data in input (private input), without revealing it. These are programs written in C, but the method can be generalized to any programming language. In the following, such a program executed in this special environment is called "ZK-SNARK program" or "ZK-SNARK verification". The system is zero-knowledge for the given private input. Initially, this work was based on the work of Shafi Goldwasser, Silvio Micali and Charles Rackoff in the 1980s (http://en.wikipedia.org/wiki/IP_%28complexity %29#PSPACE_is_a_subset_of_IP).

Figure 9:
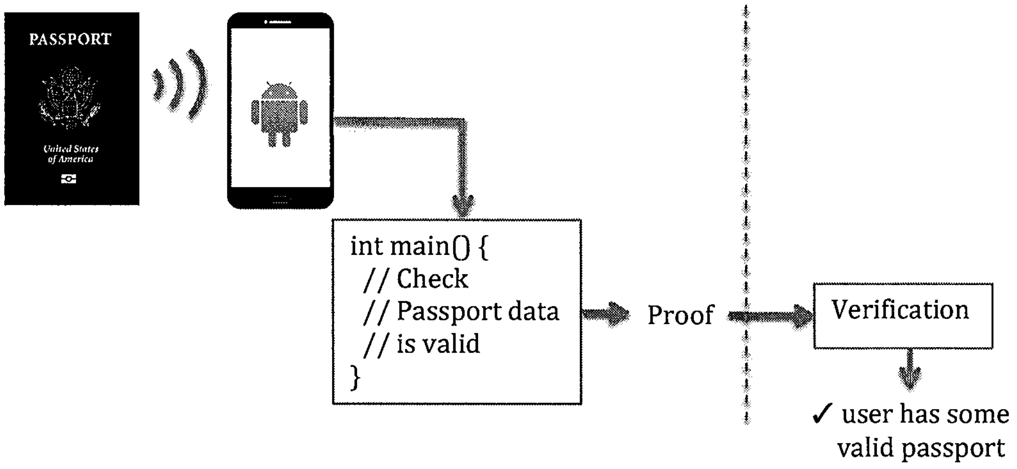
FIGS. 9 and 10 illustrate the automatic generation of rights, such as units of account transferred in transactions illustrated in previous figures.

An application of this new technology, presented in FIG. 9, is to prove the possession of an electronic passport without revealing its contents. The program is taking, as private input, by NFC, the (signed) data contained in the electronic component of the passport (cf. the ICAO document which specifies that data http://www.icao.int/publications/Documents/9303_p3_v2_cons_en.pdf), and takes in public input the public key (of the government, or several public keys) that allowed to sign that data. The ZK-SNARK program here is used to verify that it is a passport supplied by said signatory (i.e. by the government).

The invention, according to this other object, is an extension of the method used in this application, and is intended to meet the need to "minimally" identify an anonymous individual (user) to which certain benefits (or "rights") are given to a limited extent over time, to verify that the user has not already received these benefits too much or too recently and therefore the user is still entitled to it. The term "minimally" here is related to the notion of anonymity: the invention aims to safeguard the anonymity of the user as much possible while ensuring she does not receive benefits to which he is not entitled.

In one possible implementation, one can extend the aforementioned application (presented in FIG. 9) of proof of passport, by adding in public input the passport hash code (code obtained by using a predetermined cryptographic hash function on the content of passport data or a specific part of the passport data) which must also be verified by the program in ZK-SNARK (in addition to the government signature verification). No data of the passport being disclosed, the user is merely identified by this hash code rather than the passport number for example. This identification is, however, not "minimal" insofar as the identifier (said hash code) can be linked to other data that accumulate over time in data bases and, by overlap, tend to reveal more and more private information about the user.

Instead of the hash code of the passport, this object of the invention involves using a hash code that is "minimal" in that it serves only during the time when the user is entitled to a particular benefit. In case the user has no right to benefit more than the benefit intended for a given time interval (from the last time she has received it previously), or for a given calendar period (such as the current month or the current time) said hash code is used only during this time interval or this calendar period (specifically to check that the benefit in question has not already been given in this interval or period). As it then becomes obsolete and replaced by another code, and there is no relationship between different codes obtained in time for the same user, the new code will not be connected to information characterizing the user outside said interval or period.

Note that if the hash code is supposed to represent a right for a period of time, the user may require it to be different for each period and check it.

Figure 10:
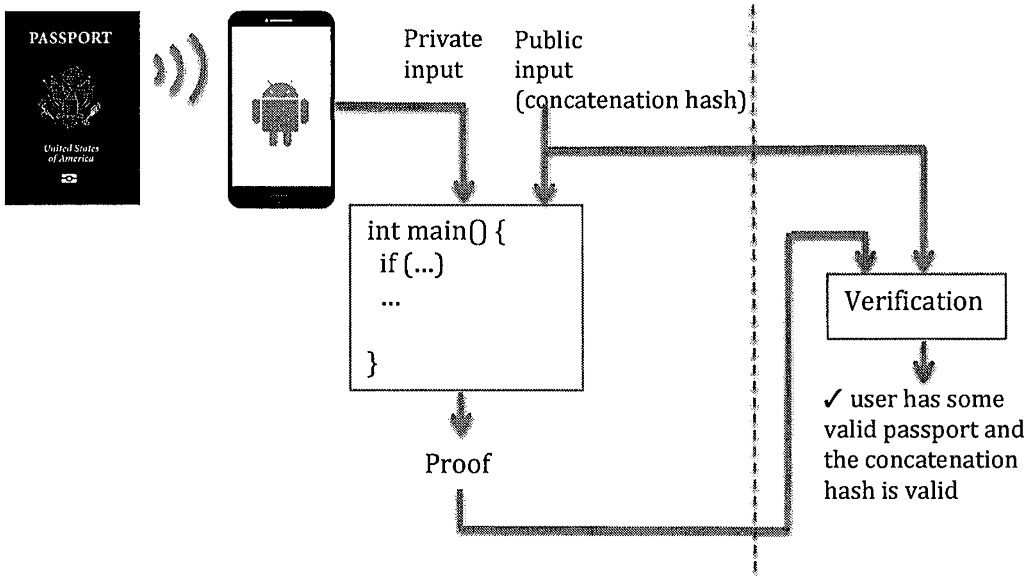

FIG. 10 is a diagram showing the method of the invention. This method can be implemented with only the actors 'user' and 'source' (i.e. the source of the benefit in question), that is to say, the respective computers used by them, without the need of a trusted third party. The verification protocol using this code includes the following steps of interaction between these players:

1. The user requests to the source the benefit in question and provides the public key(s) of the signing authority of his passport (unless the ZK-SNARK program contains in itself the public keys of the authorities, in which case the user does not have to provide it)

2. The source verifies said signing authority (unless the ZK-SNARK program contains in itself the public keys of the authorities and can thus at runtime make this verification without such input) and communicates to the user the ZK-SNARK program (unless the user has already it) and a specific string representative of a period (or interval) of validity of the benefit in question (unless that program automatically generates it)

3. The user generates the concatenation between said specific string and the data contained in the component of this passport and executes said program to prove its possession of an electronic passport (without revealing its contents) signed by the said authority, by providing:

in private input, by NFC, the data contained in the component of this passport in public input i. the public key(s) (of said authority) corresponding to the keys that allowed to sign the passport data (unless that program contains in itself the public keys of the authorities)

ii. said specific string (unless the said program automatically generates it)

iii. and the hash code of the concatenation of said specific string and data contained in the component of the passport.

and provides to the source said hash of the concatenation, and the ZK-SNARK proof (in zero-knowledge) that:

it is indeed a passport provided by the authority and said hash of the concatenation is obtained by applying the hash function on the concatenation of said specific string and data contained in the component of the passport.

4. The source verifies the said ZK-SNARK proof and, depending on the use case, also verifies, where appropriate, the non-existence in its database of said hash of the concatenation and if that is the case, inserts the hash code of the concatenation into its database (where it can be removed after the said period or interval of validity of receiving the benefit). The same process can be applied to cover a period of time where the user is continuously entitled to a particular benefit.

Said specific character string can for example be made of the current date, the period covered (or the interval during which the benefit is not due) and optionally a code (such as a random number or a specific information) for that period (or that interval).

Of course, several embodiments enable to implement the method of the invention. In a simpler variant, the specific string is not representative of a period of time but simply (or specific to) the source of rights, possibly concatenated with a random number.

The benefits in question may be in particular units of account.

ANNEX 1

Simplified Contract to Demonstrate the Generation of Constraints

```
<Script>
<Context>
        <AvailableOutputs>
            <Output address="F1" amount="1000" client="C1" />
            <Output address="F2" amount="950" client="C2" />
            <Output address="F3" amount="900" client="C3" />
        </AvailableOutputs>
        <ClientRequirements>
            <ClientRequirement client="C1" amount="1000" />
            <ClientRequirement client="C2" amount="1000" />
            <ClientRequirement client="C3" amount="1000" />
        </ClientRequirements>
</ Context>
<Contract>
class Output{
  double amount;
  String address;
  String toString( ){
    return address+":"+amount;
  }
  Output(double amount,
      String address) {
    setAmount(amount);
    setAddress(address);
  }
}
class ClientRequirement {
  double amount;
  String client;
String toString( ){
    return client+":"+amount;
  }
  ClientRequirement(
      double amount,
      String client) {
    setAmount(amount);
    setClient(client);
  }
}
class Constraint {
  double amount;
  String cldest;
  List<Constraint> dest = new LinkedList<Constraint>( );
  List<Constraint> otherOutputs = new LinkedList<Constraint>( );
  String toString( ) {
    String result = "" + amount + "@";
    if (cldest != null) {
      result += cldest;
```

-continued

```
      } else {
        result += "(";
        if (dest.size( ) > 1) {
          for (int i = 0; i < dest.size( ); i++) {
            Constraint c = dest.get(i);
            if (i < dest.size( ) - 1) {
              result += "(" + c + ")||";
            } else {
              result += "("+ c + ")";
            }
          }
        } else if (dest.size( ) > 0) {
          result += dest.get(0);
        }
        result += ")";
      }
      for (Constraint c : otherOutputs) {
        result += "+" + c;
      }
      return result;
    }
    Constraint(double amount, String cldest) {
      setAmount(amount);
      setCldest(cldest);
    }
    Constraint(double amount, List<Constraint> dest) {
      setAmount(amount);
      setDest(dest);
    }
    void addToDest(Constraint c) {
      dest.add(c);
    }
    void addToOtherOutput(Constraint c) {
      otherOutputs.add(c);
    }
}
double sum(List<Output> outputs) {
      double result = 0;
      for (Output o : outputs) {
        result += o.getAmount( );
      }
      return result;
    }
List<Constraint> generateConstraints(List<Output> availableOutputs, List<ClientRequirement>
currentRequirements) {
      List<Constraint> results = new LinkedList<Constraint>( );
      double total = sum(availableOutputs);
      for (ClientRequirement clr : currentRequirements) {
        Constraint c = null;
        if (total > clr.getAmount( )) {
          c = new Constraint(clr.getAmount( ), clr.getClient( ));
          if (total - clr.getAmount( ) > 0) {
            List<Output> newLO = new LinkedList<Output>( );
            newLO.add(new Output(total - clr.getAmount( ), "POT"));
            List<ClientRequirement> remainingRequirements = new LinkedList<ClientRequirement>( );
            remainingRequirements.addAll(currentRequirements);
            remainingRequirements.remove(clr);
            List<Constraint> dest = generateConstraints(newLO, remainingRequirements);
            Constraint otherC = new Constraint(total - clr.getAmount( ), dest);
            c.addToOtherOutput(otherC);
          }
        } else {
          c = new Constraint(total, clr.getClient( ));
        }
        results.add(c);
      }
      return results;
    }
</Contract>
</Script>
```

ANNEX 2

Simplified Contract to Demonstrate the Restricted Generation of Constraints

```
<Script>
<Context>
        <AvailableOutputs >
                <Output address="F1" amount="1000" client="C1" />
                <Output address="F2" amount="950" client ="C2" />
                <Output address="F3" amount="900" client ="C3" />
                <Output address="F4" amount="850" client ="C4" />
        </AvailableOutputs>
        <ClientRequirements>
                <ClientRequirement client="C1" amount="1000" />
                <ClientRequirement client="C2" amount="1000" />
                <ClientRequirement client="C3" amount="1000" />
                <ClientRequirement client="C4" amount="1000" />
        </ClientRequirements>
        <GenerateContraints>
                <Output address="F5" amount="800" >
                <ClientRequirement client="C5" amount="1000" />
                <Params sum="2000" n="2" />
        </GenerateContraints>
</ Context >
<Contract>
class Pledge {
    List<Output> outputs;
    List<ClientRequirement> clientRequirements;
    Pledge( ){
        outputs = new LinkedList<Output>( );
        clientRequirements = new LinkedList<ClientRequirement>( ); ;
    }
    public void addPledge(Pledge p){
        for(Output o:p.getOutputs( )){
            addOutput(o);
        }
        for(ClientRequirement cl:p.getClientRequirements( )){
            addClientRequirement(cl);
        }
    }
    public void addOutput(Output o){
        if(!outputs.contains(o)){
            outputs.add(o);
        }
    }
    public void addClientRequirement(ClientRequirement cr){
        if(!clientRequirements.contains(cr)){
            clientRequirements.add(cr);
        }
    }
}
class OutputCreationContext {
    List<Output> outputs;
    List<ClientRequirement> clientRequirements;
}
class Output{
    double amount;
    String address;
    String toString( ){
        return address+":"+amount;
    }
    Output(double amount,
            String address) {
        setAmount(amount);
        setAddress (address);
    }
}
class ClientRequirement {
    double amount;
    String client;
String toString( ){
        return client+":"+amount;
    }
    ClientRequirement(
            double amount,
            String client) {
        setAmount(amount);
        setClient(client);
```

-continued

```
    }
}
class Constraint {
    double amount;
    String cldest;
    List<Constraint> dest = new LinkedList<Constraint>( );
    List<Constraint> otherOutputs = new LinkedList<Constraint>( );
    String toString( ) {
        String result = "" + amount + "@";
        if (cldest != null) {
            result += cldest;
        } else {
            result += "(";
            if (dest.size( ) > 1) {
                for (int i = 0; i < dest.size( ); i++) {
                    Constraint c = dest.get(i);
                    if (i < dest.size( ) - 1) {
                        result += "(" + c + ")||";
                    } else {
                        result += "(" + c + ")";
                    }
                }
            } else if (dest.size( ) > 0) {
                result += dest.get(0);
            }
            result += ")";
        }
        for (Constraint c : otherOutputs) {
            result += "+" + c;
        }
        return result;
    }
    Constraint(double amount, String cldest) {
        setAmount(amount);
        setCldest(cldest);
    }
    Constraint(double amount, List<Constraint> dest) {
        setAmount(amount);
        setDest(dest);
    }
    void addToDest(Constraint c) {
        dest.add(c);
    }
    void addToOtherOutput(Constraint c) {
        otherOutputs.add(c);
    }
}
public class SuretyBond {
    /**
    * @param args the command line arguments
    */
    static double sum(List<Output> outputs) {
        double result = 0;
        for (Output o : outputs) {
            result += o.getAmount( );
        }
        return result;
    }
    static List<List<Output>> getAvailableOutputCombination(List<Output> outputs) {
        List<List<Output>> result = new LinkedList<List<Output>>( );
        for (int i = outputs.size( ); i >= 1; i--) {
            result.addAll(combinationOf(outputs, i));
        }
        return result;
    }
    static List<List<Output>> combinationOf(List<Output> outputs, int taken) {
        List<List<Output>> result = null;
        if (taken == 1) {
            result = new LinkedList<List<Output>>( );
            for (Output o: outputs) {
                List<Output> os = new LinkedList<Output>( );
                os.add(o);
                result.add(os);
            }
        } else {
            result = new LinkedList<List<Output>>( );
            List<Output> noutputs = new LinkedList<Output>( );
            noutputs.addAll(outputs);
            int k = taken - 1;
```

-continued

```
        for (Output ref: outputs) {
            noutputs.remove (ref);
            if (noutputs.size( ) >= k) {
                List<List<Output>> outt1 = combinationOf(noutputs, k);
                for (List<Output> outl : outt1) {
                    outl.add(0, ref);
                    result.add(outl);
                }
            }
        }
    }
    return result;
}
static Pledge getCombinedPledges(List<Output> outputs) {
    Pledge p = new Pledge( );
    for (Output o : outputs) {
        Pledge ox = o.getExistingPledge( );
        if (ox != null) {
            p.addPledge(ox);
        }
    }
    return p;
}
static Constraint generateConstraints(
        Output pot,
        Pledge p, List<Output> usedOutputs,
        List<ClientRequirement> paidRequirements) {
    List<Output> availableOutputs = new LinkedList<Output>( );
    availableOutputs.add(pot);
List<ClientRequirement> remainingRequirements = new LinkedList<ClientRequirement>( );
    for (ClientRequirement cr : p.getClientRequirements( )) {
        if (!paidRequirements.contains(cr)) {
            remainingRequirements.add(cr);
        }
    }
    double total = sum(availableOutputs);
    List<Constraint> dest = generateConstraints(availableOutputs, remainingRequirements);
    Constraint otherC = new Constraint(total, dest);
    return otherC;
}
static List<Constraint> generateConstraintsAutoSelectOutputs(
        Output refOutput,
        List<Output> availableOutputs,
        ClientRequirement currentRequirement,
        double sumAmount,
        int helps) {
    List<Output> selectedOutputs = new LinkedList<Output>( );
    double amt = refOutput.getAmount( );
    int i = availableOutputs.size( ) - 1;
    while (!((amt > sumAmount)&&(selectedOutputs.size ( )>=helps)) && (i >= 0)) {
        selectedOutputs.add(availableOutputs.get(i));
        amt += availableOutputs.get(i).getAmount( );
        i--;
    }
    return generateConstraints(refOutput,
            selectedOutputs,
            currentRequirement);
}
static List<Constraint> generateConstraints(
        Output refOutput,
        List<Output> selectedOutputs,
        ClientRequirement currentRequirement) {
    List<Constraint> results = new LinkedList<Constraint>( );
    List<List<Output>> lavo = getAvailableOutputCombination(selectedOutputs);
    lavo.add(new LinkedList<Output>( )); //when there’s no other output left
    for (List<Output> availableOutputs : lavo) {
        availableOutputs.add(refOutput);
        double total = sum(availableOutputs);
        Constraint c = null;
        if (total > currentRequirement.getAmount( )) {
            c = new Constraint(currentRequirement.getAmount( ), currentRequirement.getClient( ));
            if (total - currentRequirement.getAmount( ) > 0) {
                Pledge combined = getCombinedPledges(availableOutputs);
                List<Output> usedOutputs = new LinkedList<Output>( );
                List<ClientRequirement> paidRequirements = new LinkedList<ClientRequirement>( );
                paidRequirements.add(currentRequirement);
                usedOutputs.addAll(availableOutputs);
                Output pot = new Output(total - currentRequirement.getAmount( ), “POT”);
                Constraint otherC = generateConstraints(pot, combined, usedOutputs, paidRequirements);
```

-continued

```
                c.addToOtherOutput(otherC);
            }
        } else {
            c = new Constraint(total, currentRequirement.getClient( ));
        }
        results.add(c);
    }
    return results;
}
static List<Constraint> generateConstraints(List<Output> availableOutputs, List<ClientRequirement>
currentRequirements) {
    List<Constraint> results = new LinkedList<Constraint>( );
    double total = sum(availableOutputs);
    for (ClientRequirement clr : currentRequirements) {
        Constraint c = null;
        if (total > clr.getAmount( )) {
            c = new Constraint(clr.getAmount( ), clr.getClient( ));
            if (total - clr.getAmount( ) > 0) {
                List<Output> newLO = new LinkedList<Output>( );
                newLO.add(new Output(total - clr.getAmount( ), "POT"));
                List<ClientRequirement> remainingRequirements = new LinkedList<ClientRequirement>( );
                remainingRequirements.addAll(currentRequirements);
                remainingRequirements.remove(clr);
                List<Constraint> dest = generateConstraints(newLO, remainingRequirements);
                Constraint otherC = new Constraint(total - clr.getAmount( ), dest);
                c.addToOtherOutput(otherC);
            }
        } else {
            c = new Constraint(total, clr.getClient( ));
        }
        results.add(c);
    }
    return results;
  }
}
</Contract>
</Script>
```

ANNEX 3

Simplified Contract in the Second Embodiment

```
Auth {
Int             TxType;
Amount          amt;
Auth(Int TxType, Amount amt);
Auth(Int TxType);
}
Context {
Map<Wallet, List<Auth>>         authorizations;
Map<Wallet, List<Auth>>         getAuths( ) {
return authorizations;
}
void addAuth(Map<Wallet, List<Auth>> existing) {
For( Wallet w:existing.keySet( ) ) {
addAuth(w, existing.get(w));
}
}
void addAuth(Wallet w, List <Auth> auths) {
List<Auth> exist = authorizations.get(w);
If (exist == null){
exist = new List( );
}
exist.addAll(auths);
}
}
Output {
String          Address; / / Script Hash
Amount          amount;
}
Input{
String          walletPubkey;
String          signature;          / / of [TxId, index, hash of Program, TxType]
Context         ctx;
}
```

-continued

```
Transaction {
List <Output>    outputs;
List <Input>     inputs;
Int              TxType;
Static final int Refill = 1;
Static final int PC = 2;
Static final int AC = 3;
Static final int CP = 4;
transaction(     List<Input>        inputs,
List<Output>     outputs,
int              TxType);
}
Wallet {
PubKey           publicKey;
Context          lastContext;
Output           lastOutput;
Context          getLatestContext( );
Output           getLatestOutput( );
Wallet thisWallet;
Policy policy;
Blockchain blockchain ;
void AddRefill(List<Output> outputs) {
blockchain.addRefillTx(thisWallet, outputs);
}
void AddPotentialContribution(Wallet dest, Amount max{
If (max =< thisWallet.getAmount( ) ){
blockchain.addPCTx( thisWallet, dest, max);
}
else {
blockchain.addPCTx( thisWallet, dest, thisWallet.getAmount( ))
or Message("Insufficient Funds");
}
}
void AddActualContribution(Amount totalClaimAmount) {
List <Wallets> Lw = blockchain.getContributingWallets(thisWallet);
For (Wallet w: Lw) {
Amount cA = policy.getAmount(w, totalClaimAmount);
blockchain.addACTx(w, thisWallet, cA);
}
}
/ / getContributingWallets is a method in the blockchain object that searches for the
potentialContribution (PCTx) transactions in the blockchain data structure.
void AddClaimPayment(Amount totalClaimAmount) {
List<Output> outputs = blockchain.getUnusedActualContribution(thisWallet);
Amount gatheredAmount = 0;
For (Output o: outputs) {
gatheredAmount += o.getAmount( );
}
If (gatheredAmount < totalClaimAmount) {
blockchain.addCPTx(Tx.Claim, outputs, gatheredAmounts, thisWallet)
}
else {
blockchain.addCPTx(Tx.Claim, outputs, totalClaimAmount, thisWallet)
}
}
}
Blockchain {
chaindata;
boolean addRefillTx( Wallet w, List<Output> outputs) {
boolean result = true;
Amount a = 0;
List<Input> inputs = new List( );
For (Output o : outputs) {
Context ctx = w.getContext( o.getAddress( ) )
If (!ctx.permits(w,Tx.Refill)) {
result = false;
break;
}
Else {
a += o.getAmount( );
Input n = new Input(o, ctx);
inputs.add(n);
}
}
If (result) {
List <Auth> auths = new List( ) {new Auth(Tx.Refill), new Auth(Tx.PC), new Auth(Tx.AC), new
Auth(Tx.CP)};
Context          oCtx = new Context( );
oCtx = addAuth(ctx.getAuths( ) );
```

-continued

```
oCtx.addAuth(w, auths);
String          address = oCtx.gethash( );
w.addCtx(address, oCtx);
Output          newOutput = new Output(a, address);
List <Output> os = new List( ); / / outputs
os.add (newOutput);
Transaction     rf = new Transaction(inputs, os, Transaction.Refill);
chaindata.add(rf);
}
return result;
}
void addPCTx( Wallet source, Wallet dest, Amount max) {
Output o = source.getLatestOutput( );
Context         oCtx = source.getLatestContext( );
Input           n = new Input (o, oCtx);
List <Auth>     dauths = new List<Auth> {new Auth(Transaction.AC, max)}
Context         nctx = new Context( );
nctx.addAuth(source, octx.getAuths( ) );
nctx.addAuth(dest, dauths);
String          address = nctx.gethash( );
Output newOutput = new Output(o.getAmount( ), address);
List<Input>     li = new List( );
li.add( n);
List<Output>    lo = new List( );
lo.add( newOutput );
Transaction pc = new Transaction (li, lo, Transaction.PC);
chaindata.add( pc);
}
void addACTx( Wallet source, Wallet dest, Amount cA) {
Output          o = source.getLatestOutput( );
Context         octx = source.getLatestContext( );
Input           in = new Input( o, octx );
List<Input>     li = new list( );
li.add( in);
/ / Output 1
List<Auth>      auths = new List( ) { new Auth(Transaction.CP) }
Context         ctx = new Context( );
ctx.addAuth(dest, auths );
String          address1 = ctx.gethash( );
Output          o1 = new Output(cA, address1 );
List<Output>    lo = new List( );
lo.add( o1 );
/ / Output 2
If (o.getAmount( ) > cA) {
Output o2 = new Output( (o.getAmount( ) - cA), octx.gethash( ) );
lo.add( o2);
}
Transaction ac = new Transaction (li, lo, Transaction.AC);
chaindata.add( ac );
}
```

The invention claimed is:

1. A method for minimal and anonymous identification of a user entitled to be a beneficiary of rights and having an identity document issued by an issuing authority, said identity document containing machine-readable ID data signed with a public key belonging a private/public key pair of the issuing authority, the method comprising the following steps:

interacting with a source of rights from a user terminal, at said source, communicating to the user terminal a zero-knowledge proof-generating verification program, as well as a specific character string representative of said rights, said verification program having a private input and a public input and having access to the public key of said key pair, at said user terminal:

reading from said identity document a machine-readable ID data, wherein said ID data have been signed with a public key of an issuing authority, receiving and generating a hash code of a combination of said specific character string received from the source and the machine-readable ID data read from the identity document, executing the zero-knowledge proof-generating verification program using as a private input said machine-readable ID data and as a public input said hash code, so as to check, using said public key, that the identity document has been issued by said authority, and generate a proof of execution of said program, sending said hash code and said proof of execution to said source, and at said source:

executing a corresponding zero-knowledge proof verification program with the same public input and checking the validity of said proof of execution, if the proof of execution is valid, granting said rights to said user terminal, wherein no relation between the hash code received at said source and said identity document can be established by said source, thus preserving user anonymity, wherein said character string is unique to given rights for a given period of time, and there is no relationship between different codes obtained in time for said user so that user anonymity as regards the ID data is preserved, wherein said combination is based on a random number provided by said source, and wherein the number of times rights are granted for said period of time is controlled at said source by storing each hash code received from a user terminal and comparing said received hash code with previously stored hash codes.

2. A method for minimal and anonymous identification of a user entitled to be a beneficiary of rights and having an identity document issued by an issuing authority, said identity document containing machine-readable ID data signed with a public key belonging a private/public key pair of the issuing authority, the method comprising the following steps:

interacting with a source of rights from a user terminal, at said source, communicating to the user terminal a zero-knowledge proof-generating verification program, as well as a specific character string representative of said rights, said verification program having a private input and a public input and having access to the public key of said key pair, at said user terminal:

reading from said identity document a machine-readable ID data, wherein said ID data have been signed with a public key of an issuing authority, receiving and generating a hash code of a combination of said specific character string received from the source and the machine-readable ID data read from the identity document, executing the zero-knowledge proof-generating verification program using as a private input said machine-readable ID data and as a public input said hash code, so as to check, using said public key, that the identity document has been issued by said authority, and generate a proof of execution of said program, sending said hash code and said proof of execution to said source, and at said source:

executing a corresponding zero-knowledge proof verification program with the same public input and checking the validity of said proof of execution, if the proof of execution is valid, granting said rights to said user terminal, wherein no relation between the hash code received at said source and said identity document can be established by said source, thus preserving user anonymity, wherein said character string is unique to given rights for a given period of time, and there is no relationship between different codes obtained in time for said user so that user anonymity as regards the ID data is preserved.

3. The method according to claim 2, wherein said combination is a concatenation.

4. A method according to claim 2, wherein said combination is further based on a random number provided by said source.

5. The method as claimed in claim 2, further comprising, at said source, storing each hash code received from a user terminal and comparing hash code received with previously stored hash codes, whereby the number of times rights are granted can be controlled.

6. The method as claimed in claim 2, further comprising, at said source, storing each hash code received from a user terminal and comparing hash code received with previously stored hash codes, whereby the number of times rights are granted for said period of time can be controlled.

* * * * *